P. PORGES & R. NEUMANN.
APPARATUS FOR SEPARATING SOLID BODIES FROM LIQUIDS BY COOLING.
APPLICATION FILED FEB. 24, 1906.
914,183.
Patented Mar. 2, 1909.
Fig. 1.
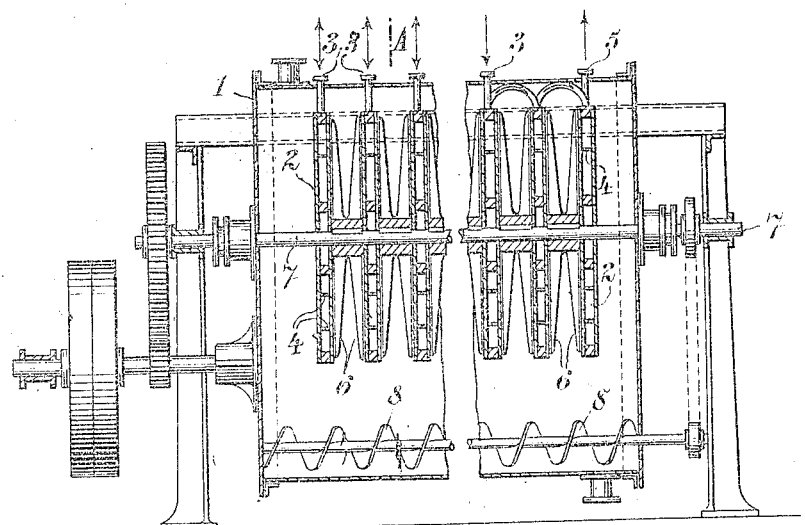
Fig. 2.
Fig. 3.
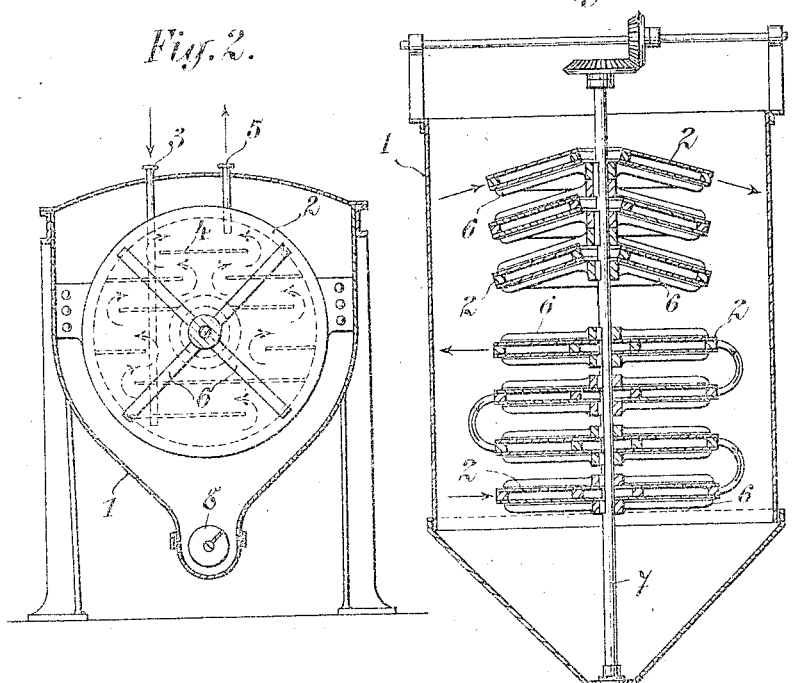
Witnesses.
Inventors.
Philipp Porges
and Richard Neumann

UNITED STATES PATENT OFFICE.

PHILIPP PORGES, OF VIENNA, AND RICHARD NEUMANN, OF BRÜNN-KÖNIGSFELD, AUSTRIA-HUNGARY.

APPARATUS FOR SEPARATING SOLID BODIES FROM LIQUIDS BY COOLING.

No. 914,183.  Specification of Letters Patent.  Patented March 2, 1909.

Application filed February 24, 1906. Serial No. 302,824.

*To all whom it may concern:*

Be it known that we, PHILIPP PORGES, director, and RICHARD NEUMANN, engineer, both subjects of the Emperor of Austria-Hungary, and residents, respectively, of Vienna and Brünn-Königsfeld, Moravia, in the Empire of Austria-Hungary, have invented Apparatus for the Separating of Solid Bodies from Liquids by Cooling; and we do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention relates to a cooling process for the separation of solid bodies in which they are dissolved, such, for example, as paraffin, from paraffin oil and to apparatus for cooling the liquid for effecting the separation.

The process consists in cooling the body of the liquid by a suitable number of cooling bodies arranged in proximity to one another, in continuously removing the solids deposited upon the walls or surfaces thereof by means of agitators, such as scraping or stirring mechanisms and in conveying them away from the vessel.

In cooling apparatus as heretofore used for this purpose, the paraffin oil or the like to be cooled is introduced into a vessel the wall of which is cooled by a fluid which circulates in a jacket inclosing the vessel. For increasing the cooling action or for enlarging the cooling surface a smaller vessel containing the cooling liquid is arranged within the oil vessel so that the oil is held in an annular space the outer and inner walls of which are cooled. Such apparatus possesses, however, the disadvantage that the cooling surface is small relatively with the circumference of the vessel, so that the efficient cooling of the liquid and consequent separation of the solids is a slow process.

The cooling apparatus which we employ for carrying out our invention consists of a battery, of cooling plates connected together in series or in parallel and preferably in the form of hollow bodies into which the cooling fluid (water, brine, ammonia or the like) is introduced and through which it circulates. The paraffin oil or the like which is conveyed into the space surrounding the cooling bodies is in this way divided into layers by the cooling plates and the said layers may be made as thin as is desired so that the cooling which is thus effected in the mass of the liquid is extremely efficient and takes place rapidly. The cooling surfaces, which are formed by the sides of the cooling bodies and the extent of which can consequently be easily increased by the enlargement of the diameter of the vessel, are continuously scraped by agitating or scraping mechanism so that the deposits which are formed thereon are removed, whereby good conduction is insured and the space between the contiguous cooling bodies may be made as small as possible thus insuring a rapid and efficient cooling and consequent separation.

In the drawing we have illustrated examples of cooling apparatus constructed according to the invention in which:—

Figure 1 is a longitudinal section of the apparatus, the left hand portion of the figure showing an arrangement wherein each cooling plate is supplied with fresh cooling liquid and the right hand part of the figure an arrangement in which the cooling plates are connected together in series. Fig. 2 is a transverse section of the apparatus on the line A—A, Fig. 1, and Fig. 3 illustrates an upright construction of cooling apparatus.

1 is the vessel for containing the paraffin oil or the like to be cooled and 2, 2 are the hollow bodies arranged within the same and which are formed of hollow flat, conical or other bodies, the shape of which is such that the sides or cooling surfaces thereof may be subjected to the action of scraping or agitating mechanism which simultaneously effects the mixture of the liquid. The cooling fluid is conveyed into the interior of the cooling bodies, for example, by means of pipes 3 and the said fluid is caused to circulate within the said bodies, for instance by means of baffles or the like 4, suitably superposed within the same so that the fluid cannot pass out through the outlet 5 until it has been practically completely utilized. The arrangement may be such that each hollow body is separately supplied with fresh cooling fluid (Fig. 1, left hand) or such that the cooling fluid leaving one plate is conveyed into the next adjacent plate and so on (Fig. 1, right hand) and is only discharged after leaving the last plate; the parallel arrangement of the plates can be combined with the series arrangement.

Scrapers or stirrers 6 are provided on each side of each plate, the said scrapers being preferably keyed upon a common shaft 7 which passes through the cooling bodies and which gives the scrapers their motion. During the operation of the apparatus they continuously scrape the surfaces of the cooling bodies so that the substance which is separated from the liquid and is deposited upon the said surfaces is continuously removed. By this means the good conduction of the cooling bodies is insured and, as deposits upon the cooling surfaces are prevented, the plates or cooling bodies may be arranged in near proximity to one another so that the layer of paraffin oil (or the liquid) to be cooled between two contiguous cooling bodies is very thin, the resulting cooling action being consequently rapid and efficient. The deposits which take place upon the cooling surfaces and which are continuously removed by the scrapers which also maintain the liquid in circulation are removed from the vessel by suitable means such as the worm 8 arranged within the said vessel.

For continuous working it is advantageous to operate upon the counter current principle and to this end we may arrange the cooling bodies in series in such a manner that the cooling fluid after flowing through one cooling plate is conveyed into the adjacent plate and is only discharged after its passage through the last plate, the paraffin oil being conveyed into and caused to flow through the vessel inclosing the cooling bodies in the opposite direction to that in which the cooling fluid circulates.

Fig. 3 of the drawings shows an upright apparatus wherein the cooling bodies 2 are of a conical shape. The said bodies may be arranged as in the preceding example either parallel to one another or in series or in parallel and series groups. The deposits adhering to the conically shaped cooling surfaces are removed therefrom, as above described, by scrapers 6 or stirring mechanism. The conical form of the cooling bodies increases their acting surfaces and facilitates the removal of the deposit by the scrapers, it being observed that the convex side of each cooling body is uppermost.

What we claim as our invention, and desire to secure by Letters Patent is:—

1. In an apparatus for separating solids from liquids in which they are dissolved by cooling, the combination of the vessel containing the liquid to be cooled, a series of relatively narrow circular hollow bodies arranged side by side in said vessel, an inlet and an outlet for each of said bodies, a series of baffle plates arranged in said bodies in substantially staggered relation whereby to form a tortuous or zig zag space through each hollow body, and a series of scrapers arranged to act upon substantially the whole outer surface of said hollow bodies, substantially as described.

2. In an apparatus for separating solids from liquids in which they are dissolved by cooling, the combination of the vessel containing the liquid to be cooled, a series of circular hollow bodies through which the cooling medium circulates arranged parallel with each other and each conical in cross section, said bodies being arranged in superposed disposition with their convex sides uppermost, scrapers, and a common rotary spindle carrying said scrapers and extending through said hollow bodies, said scrapers being arranged to act upon the whole of the outer surfaces of said hollow bodies, substantially as described.

In testimony whereof we have signed our names to this specification in the presence of two subscribing witnesses.

PHILIPP PORGES.
RICHARD NEUMANN.

Witnesses as to Philipp Porges:
  HUGO REIK,
  WENZEL LINKEFORG.
Witnesses for Richard Neumann:
  C. ROUSE,
  G. GLASSY.